United States Patent [19]

Nakamura et al.

[11] Patent Number: 5,663,006
[45] Date of Patent: Sep. 2, 1997

[54] CORROSION-RESISTANT MAGNETIC FILM AND MAGNETIC HEAD USING THE SAME

[75] Inventors: Hitoshi Nakamura, Hachioji; Shigekazu Otomo, Sayama, both of Japan

[73] Assignee: Hitachi, Ltd., Tokyo, Japan

[21] Appl. No.: 98,715

[22] Filed: Jul. 29, 1993

[30] Foreign Application Priority Data

Aug. 3, 1992 [JP] Japan ................... 4-206435

[51] Int. Cl.$^6$ ........................... G11B 5/66
[52] U.S. Cl. .................... 428/694 R; 428/694 T; 428/900; 360/13; 360/110; 360/126
[58] Field of Search ............... 428/694 T, 900, 428/694 R; 360/13, 110, 126

[56] References Cited

U.S. PATENT DOCUMENTS

| | | | |
|---|---|---|---|
| 3,864,751 | 2/1975 | Beaulieu | 360/13 |
| 4,663,685 | 5/1987 | Tsang | 360/13 |
| 4,786,553 | 11/1988 | Shiroishi et al. | 428/336 |
| 4,835,069 | 5/1989 | Sawada | 428/684 T |
| 5,001,586 | 3/1991 | Aboaf et al. | 360/13 |

FOREIGN PATENT DOCUMENTS

| | | |
|---|---|---|
| 57-57854 | 4/1982 | Japan . |
| 320444A | 1/1991 | Japan . |
| 3-20444 | 1/1991 | Japan . |

OTHER PUBLICATIONS

Patent Abstracts of Japan, C-120, vol. 6, No. 158; JP 57-76170 A.
Patent Abstracts of Japan, C-180, vol. 7, No. 181; JP 58-84957 A.
Patent Abstracts of Japan, C-411, vol. 11, No. 89; JP 61-243152 A.

*Primary Examiner*—Leszek Kiliman
*Attorney, Agent, or Firm*—Antonelli, Terry, Stout & Kraus, LLP.

[57] ABSTRACT

A ferromagnetic film made of an alloy of FeMQC-R, wherein M is at least one element selected from Hf, Zr, Ta, Nb, W, Ti, Mo and V; Q is at least one element selected from Cr, Rh and Ru; and R is at least one rare earth element such as Sm, Nd, etc., is low in magneto-striction, high in saturation magnetic flux density, good in soft magnetic properties and excellent in corrosion resistance, and suitable for producing a magnetic head having a high and stable reproducing output for a long period of time.

29 Claims, No Drawings

CORROSION-RESISTANT MAGNETIC FILM AND MAGNETIC HEAD USING THE SAME

BACKGROUND OF THE INVENTION

This invention relates to a magnetic film having a high saturation magnetic flux density, high permeability, high heat resistance and excellent corrosion resistance, particularly to a ferromagnetic metallic film suitable for a magnetic head used in magnetic disc apparatuses, digital VTRs, etc. and for a core material used in such magnetic heads.

With an increase of density of magnetic recording, a metal in gap head, which is possible for sufficient writing even on media with high coercivity, has been noticed. But, since the metal in gap head requires a high temperature process such as glass bonding, it is necessary to use a magnetic film having high thermal stability. As the magnetic film having relatively high thermal stability and used in the metal in gap head, there are known films made of Co series amorphous magnetic alloys, sendust alloys, and magnetic alloys having a relatively large amount of carbon, for example, Fe (Ti, Zr, Hf, Nb, Ta, Mo, W) C disclosed in Japanese Patent Unexamined Publication No. 3-20444. As a result of evaluation of corrosion resistance of these magnetic films by a constant-temperature constant-humidity test and a test of spraying a salt solution, the Co series amorphous alloys and sendust alloys show relatively excellent corrosion resistance but relatively low saturation magnetic flux density of 1.1 to 1.3 T in the composition range showing good soft magnetic properties. On the other hand, the magnetic alloys having a relatively large amount of carbon such as Fe (Ti, Zr, Hf, Nb, Ta, Mo, W) C show a saturation magnetic flux density of as high as 1.5 to 1.6 T in the composition range showing good soft magnetic properties, but have a problem in corrosion resistance in that corrosion takes place during a production process of magnetic heads, reproducing output is lowered when a recording and reproducing test is repeated in a long period of time, etc. It has become clear that these problems are caused by corrosion of the magnetic film.

In order to improve the corrosion resistance, an element (e.g. Cr, Rh, Ru) which has been regarded as effective for improving the corrosion resistance was added to the Fe (Ti, Zr, Hf, Nb, Ta, Mo, W) C film and subjected to the corrosion resistance test. As a result, it was found that each element of Cr, Rh and Ru is effective for improving the corrosion resistance, and particularly Cr is effective for improving not only the corrosion resistance but also the soft magnetic properties. But when the adding amount of these elements (Cr, Rh, Ru) was increased for further improving the corrosion resistance, the magneto-striction increased positively to a value of as large as $20 \times 10^{-7}$ or more in the composition range showing good corrosion resistance, resulting in failing to obtain magnetic films having low magneto-striction.

SUMMARY OF THE INVENTION

It is an object of the present invention to provide a ferromagnetic film having excellent corrosion resistance equal to that of sendust alloys, low magneto striction, and saturation magnetic flux density equal to or more than that of sendust alloys.

It is another object of the present invention to provide a magnetic head obtained by using the above-mentioned ferromagnetic film as at least a part of magnetic head core.

The present invention provides a corrosion resistant ferromagnetic film made of an alloy of Fe-MQC-R, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in a concentration of 0.5 to 20 atomic %, said Q being contained in a concentration of 0.5 to 12 atomic %, said C being contained in a concentration of 2.0 to 20 atomic %, and said R being contained in a concentration of 0.5 to 10 atomic %, a total being 100 atomic %.

The present invention also provides a corrosion resistant ferromagnetic film made of an alloy of FeMQC-R-Co and/or Ni, wherein Co and/or Ni is contained in a concentration of 15 atomic % or less and more than 0 atomic %.

The present invention further provide a magnetic head obtained by using the above-mentioned corrosion resistant ferromagnetic film as at least a part of magnetic head core.

DESCRIPTION OF THE PREFERRED EMBODIMENTS

According to the present invention, by adding at least one rare earth element (R) such as Sm, Nd, etc. to an alloy of FeMQC, wherein M is at least one element selected from the group consisting of Hf, Zr, Ta, Nb, W, ti, Mo and V; and Q is at least one element selected from the group consisting of Cr, Rh and Ru, there can be obtained a ferromagnetic film having low magneto striction, good soft magnetic properties and excellent corrosion resistance, in concentrations of M in the range of 0.5 to 20 atomic %, Q in the range of 0.5 to 12 atomic %, C in the range of 2.0 to 20 atomic %, and R in the range of 0.5 to 10 atomic %, a total being 100 atomic %.

In the above-mentioned FeMQC alloy film, the element M becomes a carbide by heat treatment, said carbide precipitating on boundaries of crystal grains of Fe so as to inhibit the growth of Fe crystal grains, resulting in contributing to improvement of heat resistance of the film. The element Q selected from Cr, Rh, and Ru seems to improve the corrosion resistance of the film, the mechanism of it being not clear. Further, the addition of the rare earth element such as Sm, Nd, etc., to the alloy of FeMQC is effective for reducing the magneto-striction without damaging the soft magnetic properties.

After studying the composition of film made of an alloy of FeMQC-R showing the saturation magnetic flux density equal to or more than that of sendust alloys, it was found that the concentration of M (Hf, Zr, Ta, Nb, W, Ti, Mo, V) is preferably 0.5 to 20 atomic %, the concentration of Q (Cr, Rh, Ru) is preferably 0.5 to 1.4 atomic %, the concentration of C is preferably 2.0 to 20 atomic %, and the concentration of R is preferably 0.5 to 10 atomic %; or alternatively the concentration of M (Hf, Zr, Ta, Nb, W, Ti, Mo, V) is preferably 10.1 to 20 atomic %, the concentration of Q (Cr, Rh, Ru) is preferably 1.5 to 15 atomic %, the concentration of C is preferably 2.0 to 20 atomic %, and the concentration of R is preferably 0.5 to 10 atomic %.

A part of Fe can be replaced by Co and/or Ni in a concentration of 15 atomic % or less without lowering the properties of the resulting corrosion resistant ferromagnetic film.

Preferable embodiments of the corrosion resistant ferromagnetic film of the present invention are as follows.

(1) A corrosion resistant ferromagnetic film is made of an alloy of FeMQC-R, wherein M is at least one element selected from the group consisting of Hf, Zr, Ta, Nb, W, Ti, Mo and V; Q is at least one element selected from the group consisting of Cr, Rh, and Ru; and R is at least one rare earth element, said M being contained in a concentration of 0.5 to 20 atomic %, said Q being contained in a concentration of 0.5 to 12 atomic %, said C being contained in a concentration of 2.0 to 20 atomic %, and said R being contained in a concentration of 0.5 to 10 atomic %, a total being 100 atomic %.

(2) A corrosion resistant ferromagnetic film is made of an alloy of FeMQC-R, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in a concentration of 0.5 to 20 atomic %, said Q being contained in a concentration of 0.5 to 1.4 atomic %, said C being contained in a concentration of 2.0 to 20 atomic %, and said R being contained in a concentration of 0.5 to 10 atomic %, a total being 100 atomic %.

(3) A corrosion resistant ferromagnetic film is made of an alloy of FeMQC-R, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in a concentration of 10.1 to 20 atomic %, said Q being contained in a concentration of 1.5 to 12 atomic %, said C being contained in a concentration of 2.0 to 20 atomic %, and said R being contained in a concentration of 0.5 to 10 atomic %, a total being 100 atomic %.

(4) A corrosion resistant ferromagnetic film is made of an alloy of FeMQC-R, wherein M is at least one element selected from the group consisting of Hf, Zr, Ta, Nb and W; Q is at least one element selected from the group consisting of Cr, Rh and Ru; and R is at least one rare earth element, said M being contained in a concentration of 0.5 to 10 atomic %, said Q being contained in a concentration of 1.5 to 12 atomic %, said C being contained in a concentration of 2.0 to 14 atomic %, and said R being contained in a concentration of 0.5 to 7 atomic %, a total being 100 atomic %.

(5) A corrosion resistant ferromagnetic film is made of an alloy of FeMQC-R-Co and/or Ni, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in a concentration of 0.5 to 20 atomic %, said Q being contained in a concentration of 0.5 to 12 atomic %, said C being contained in a concentration of 2.0 to 20 atomic %, said Co and/or Ni being contained in a concentration of 15 atomic % or less, and said R being contained in a concentration of 0.5 to 10 atomic %, a total being 100 atomic %.

(6) A corrosion resistant ferromagnetic film is made of an alloy of FeMQC-R-Co and/or Ni, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in a concentration of 0.5 to 20 atomic %, said Q being contained in a concentration of 0.5 to 1.4 atomic %, said C being contained in a concentration of 2.0 to 20 atomic %, said Co and/or Ni being contained in a concentration of 15 atomic % or less, and said R being contained in a concentration of 0.5 to 10 atomic %, a total being 100 atomic %.

(7) A corrosion resistant ferromagnetic film is made of an alloy of FeMQC-R-Co and/or Ni, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in a concentration of 10.1 to 20 atomic %, said Q being contained in a concentration of 1.5 to 12 atomic %, said C being contained in a concentration of 2.0 to 20 atomic %, said Co and/or Ni being contained in a concentration of 15 atomic % or less, and said R being contained in a concentration of 0.5 to 10 atomic %, a total being 100 atomic %.

(8) A corrosion resistant ferromagnetic film is made of an alloy of FeMQC-R-Co and/or Ni, wherein M is at least one element selected from the group consisting of Hf, Zr, Ta, Nb and W; Q is at least one element selected from the group consisting of Cr, Rh and Ru; and R is at least one rare earth element, said M being contained in a concentration of 0.5 to 10 atomic %, said Q being contained in a concentration of 1.5 to 12 atomic %, said C being contained in a concentration of 2.0 to 14 atomic %, said Co and/or Ni being contained in a concentration of 15 atomic % or less, and said R being contained in a concentration of 0.5 to 7 atomic %, a total being 100 atomic %.

In the corrosion resistant ferromagnetic films of (1) to (8) mentioned above, the rare earth element is preferably at least one element selected from the group consisting of Ce, Pr, Nd, Sm, Tb, Dy and Gd.

These ferromagnetic films can be produced by a conventional process, e.g. sputtering, etc.

Magnetic heads can be produced by using these corrosion resistant ferromagnetic films (1) to (8) as at least a part of magnetic head core.

These magnetic heads can be produced by a conventional process, e.g. a process disclosed in Japanese Patent Unexamined Publication No. 62-60113.

The present invention is illustrated by way of the following Examples.

EXAMPLE 1

Magnetic films were produced by using a RF sputtering apparatus. The sputtering was carried out under the following conditions:

Sputtering gas: Ar

Gas pressure of sputtering: $6.6 \times 10^{-1}$ Pa

High-frequency electric power: 400 W

Distance to target substrate: 50 mm

Substrate temperature: 50° to 100° C. (water cooling)

The films were produced by using composite targets obtained by adhering each chip of elements to be added on a Fe target. As the substrate, crystallized glass having a diameter of 10 mm was used. Films having various compositions with a film thickness of 2 μm were formed and heat treated at 550° C. for 1 hour in an atmosphere of Ar gas.

The resulting magnetic films were subjected to the measurement of magnetic properties and corrosion resistance test. The results are shown in Table 1.

In Table 1, the magnetic film composition was measured by the EPMA (electron probe microanalysis) method. As to the carbon, confirmation was made using other methods such as a burning infrared absorption method, but slight errors may be included in the data. The coercivity was measured by using a B-H curve tracer. The saturation magnetic flux density was measured by VSM (vibrating sample magnetometer). The magneto-striction was measured by an optical lever method. The evaluation of corrosion resistance was conducted by measuring a time required for reducing magnetization of a film in 10% using a constant-temperature constant-humidity tester (80° C., 90%).

TABLE 1

| Run No. | Magnetic film composition | Saturation magnetic flux density (T) | Coercivity (Oe) | Magneto striction (× $10^{-7}$) | Corrosion resistant time (hr) |
| --- | --- | --- | --- | --- | --- |
| 1 | $Fe_{88}Al_3Si_9$ | 1.30 | 0.8 | 4 | >500 |
| 2 | $Fe_{80}Ta_8C_{12}$ | 1.55 | 0.8 | 2 | 40 |
| 3 | $Fe_{79}Ta_8C_{12}Cr_1$ | 1.53 | 0.8 | 4 | 100 |
| 4 | $Fe_{79}Hf_8C_{12}Ru_1$ | 1.52 | 1.2 | 10 | 70 |
| 5 | $Fe_{78}Ta_8C_{10}Rh_4$ | 1.50 | 1.1 | 60 | >500 |
| 6 | $Fe_{79}Hf_8C_{10}Ru_3$ | 1.45 | 1.8 | 20 | >500 |
| 7 | $Fe_{77}Zr_9C_{10}Cr_4$ | 1.47 | 0.7 | 25 | >500 |
| 8 | $Fe_{78}Ta_7C_9Cr_1Sm_5$ | 1.50 | 1.0 | 1 | >500 |
| 9 | $Fe_{72}Nb_{11}C_{13}Cr_2Sm_2$ | 1.40 | 0.8 | 7 | >500 |
| 10 | $Fe_{77}Nb_8C_{10}Rh_1Nd_4$ | 1.43 | 0.9 | 8 | >500 |
| 11 | $Fe_{73}W_{11}C_{12}Cr_2Nd_2$ | 1.35 | 1.0 | 8 | >500 |
| 12 | $Fe_{71}Co_5Ta_8C_{10}Cr_1Sm_5$ | 1.31 | 1.2 | 10 | >500 |
| 13 | $Fe_{79}Ta_7C_9Cr_3Sm_2$ | 1.50 | 0.8 | 1 | >500 |
| 14 | $Fe_{77}Nb_6C_9Cr_4Sm_4$ | 1.42 | 1.0 | 3 | >500 |
| 15 | $Fe_{78}Nb_8C_{10}Rh_2Nd_2$ | 1.45 | 0.9 | 8 | >500 |
| 16 | $Fe_{75}W_9C_{11}Cr_3Nd_2$ | 1.40 | 1.0 | 7 | >500 |
| 17 | $Fe_{70}Co_5Ta_8C_{10}Cr_3Sm_4$ | 1.30 | 1.5 | 10 | >500 |

As shown in Table 1, when Cr, Rh and the like element is not added or added in a small amount, the resulting magnetic films are low in magneto striction and relatively good in soft magnetic properties, but poor in corrosion resistance as shown in Run Nos. 2 to 4. When Cr, Rh and the like element is added in a relatively large amount, the resulting magnetic films are relatively good in soft magnetic properties and corrosion resistance, but very large in magneto striction as shown in Run. Nos. 5 to 7.

In contrast, when the magnetic films contain Fe as a main component, an element selected from Hf, Zr, Ta, Nb, W, Ti, Mo and V, another element selected from Cr, Rh and Ru, carbon (C), and a rare earth element simultaneously as shown in Run Nos. 8 to 17, these films are low in magneto-striction, good in soft magnetic properties and also good in corrosion resistance. Therefore, these magnetic films are suitable for magnetic head core materials used for high density magnetic recording, such as magnetic disc apparatuses, digital VTRs, etc.

EXAMPLE 2

Magnetic heads were produced using typical magnetic films shown in Table 1. Using the resulting magnetic heads, a recording-reproducing test was conducted for a long period of time using a metal tape having coercivity of 1500 Oe. The test was carried out in a constant-temperature constant-humidity tester (80° C., 90%) as used in Example 1. The recording reproducing properties were evaluated by measuring changes in reproducing output. A magnetic head was produced by forming a ferromagnetic film on a ferrite substrate as disclosed in Japanese Patent Unexamined Publication No. 62-60113. The thickness of each magnetic film was 6 μm.

Changes of reproducing output (mVp-p) with the lapse of time at 80° C. and 90% RH are shown in Table 2.

TABLE 2

| Sample | Test period (days) | | | | |
| --- | --- | --- | --- | --- | --- |
| | 0 | 10 | 20 | 30 | 50 |
| $Fe_{88}Al_3Si_9$ | 0.13 | 0.13 | 0.12 | 0.11 | 0.10 |
| $Fe_{80}Ta_8C_{12}$ | 0.15 | 0.07 | 0.03 | 0.01 | Unmeasurable |
| $Fe_{77}Zr_9C_{10}Cr_4$ | 0.10 | 0.10 | 0.09 | 0.08 | 0.07 |
| $Fe_{72}Nb_{11}C_{13}Cr_2Sm_2$ (The present invention) | 0.14 | 0.14 | 0.13 | 0.12 | 0.11 |
| $Fe_{79}Ta_7C_9Cr_3Sm_2$ (The present invention) | 0.15 | 0.15 | 0.14 | 0.13 | 0.12 |

As shown in Table 2, the ferromagnetic metallic films of the present invention provide magnetic heads which show excellent corrosion resistance equal to that of the magnetic heads obtained from sendust alloys, and excellent reproducing output equal to or better than that of the magnetic heads obtained from sendust alloys, $Fe_{77}Zr_9 C_{10}Cr_4$ film, etc. as a core material. The lowering of reproducing output after 50 days of constant-temperature constant-humidity test is as small as about 20%. This seems to be a result of the fact that the ferromagnetic metallic films of the present invention are low in magneto-striction, high in saturation magnetic flux density and good in corrosion resistance.

In contrast, in the case of using the FeTaC film, since the corrosion resistance is poor in spite of the same high saturation magnetic flux density as the present invention, the reproducing output seems to be lowered rapidly. Further, in the case of using the FeZrCCr film obtained by using a high saturation magnetic flux density material, the reproducing output is also low probably due to large magneto striction ($25 \times 10^{-7}$).

As mentioned above, the present invention is effective for lowering the magneto-striction of ferro-magnetic films, while maintaining high saturation magnetic flux density, good soft magnetic properties and good corrosion resistance. By using such ferromagnetic films of the present invention as a magnetic head core or a part of the magnetic head core, there can be obtained magnetic heads excellent in recording and reproducing properties and excellent corrosion resistance.

What is claimed is:

1. A corrosion resistant ferromagnetic film made of an alloy of FeMQC-R having crystal grains of Fe, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in the concentration of 0.5 to 20 atomic %, said Q being contained in a concentration of 0.5 to 12 atomic %, said C being contained in a concentration of 2 0 to 20 atomic %, said R being contained in a concentration of 0.5 to 10 atomic %, and Fe being contained in a remaining concentration, with a total concentration of Fe, M, Q, C and R being 100 atomic %.

2. A ferromagnetic film according to claim 1, wherein the rare earth element is at least one member selected from the group consisting of Ce, Pr, Nd, Sm, Tb, Dy and Gd.

3. A corrosion resistant ferromagnetic film made of an alloy of FeMQC-R having crystal grains of Fe, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in the concentration of 0.5 to 20 atomic %, said Q being contained in a concentration of 0.5 to 1.4 atomic %, said C being contained in a concentration of 2.0 to 20 atomic %, said R being contained in a concentration of 0.5 to 10 atomic %, and Fe being contained in a remaining concentration, with a total concentration of Fe, M, Q, C and R being 100 atomic %.

4. A ferromagnetic film according to claim 3, wherein the rare earth element is at least one member selected from the group consisting of Ce, Pr, Nd, Sm, Tb, Dy and Gd.

5. A corrosion resistant ferromagnetic film made of an alloy of FeMQC-R having crystal grains of Fe, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in the concentration of 10.1 to 20 atomic %, said Q being contained in a concentration of 1.5 to 12 atomic %, said C being contained in a concentration of 2.0 to 20 atomic %, said R being contained in a concentration of 0.5 to 10 atomic %, and Fe being contained in a remaining concentration, with a total concentration of Fe, M, Q, C and R being 100 atomic %.

6. A ferromagnetic film according to claim 4, wherein the rare earth element is at least one member selected from the group consisting of Ce, Pr, Nd, Sm, Tb, Dy and Gd.

7. A corrosion resistant ferromagnetic film made of an alloy of FeMQC-R having crystal grains of Fe, wherein M is at least one element selected from the group consisting of Hf, Zr, Ta, Nb and W; Q is at least one element selected from the group consisting of Cr, Rh and Ru; and R is at least one rare earth element, said M being contained in the concentration of 0.5 to 10 atomic %, said Q being contained in a concentration of 1.5 to 12 atomic %, said C being contained in a concentration of 2.0 to 14 atomic %, said R being contained in a concentration of 0.5 to 7 atomic %, and Fe being contained in a remaining concentration, with a total concentration of Fe, M, Q, C and R being 100 atomic %.

8. A ferromagnetic film according to claim 7, wherein the rare earth element is at least one member selected from the group consisting of Ce, Pr, Nd, Sm, Tb, Dy and Gd.

9. A corrosion resistant ferromagnetic film made of an alloy of FeMQC-R containing at least one of Co and Ni and having crystal grains of Fe, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in the concentration of 0.5 to 20 atomic %, said Q being contained in a concentration of 0.5 to 12 atomic %, said C being contained in a concentration of 2.0 to 20 atomic %, said at least one of Co and Ni being contained in a concentration of 15 atomic % or less, said R being contained in a concentration of 0.5 to 10 atomic %, and Fe being contained in a remaining concentration, with a total concentration of at least one of Co and Ni, Fe, M, Q, C and R being 100 atomic %.

10. A ferromagnetic film according to claim 9, wherein the rare earth element is at least one member selected from the group consisting of Ce, Pr, Nd, Sm, Tb, Dy and Gd.

11. A corrosion resistant ferromagnetic film made of an alloy of FeMQC-R containing at least one of Co and Ni and having crystal grains of Fe, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in the concentration of 0.5 to 20 atomic %, said Q being contained in a concentration of 0.5 to 1.4 atomic %, said C being contained in a concentration of 2.0 to 20 atomic %, said at least one of Co and Ni being contained in a concentration of 15 atomic % or less, said R being contained in a concentration of 0.5 to 10 atomic %, and Fe being contained in a remaining concentration, with a total concentration of at least one of Co and Ni, Fe, M, Q, C and R being 100 atomic %.

12. A ferromagnetic film according to claim 11, wherein the rare earth element is at least one member selected from the group consisting of Ce, Pr, Nd, Sm, Tb, Dy and Gd.

13. A corrosion resistant ferromagnetic film made of an alloy of FeMQC-R containing at least one of Co and Ni and having crystal grains of Fe, wherein M is at least one element selected from the group consisting of Hf, Zr, Ta, Nb, W, Ti, Mo and V; Q is at least one element selected from the group consisting of Cr, Rh and Ru; and R is at least one rare earth element, said M being contained in the concentration of 10.1 to 20 atomic %, said Q being contained in a concentration of 1.5 to 12 atomic %, said C being contained in a concentration of 2.0 to 20 atomic %, said at least one of Co and Ni being contained in a concentration of 15 atomic % or less, said R being contained in a concentration of 0.5 to 10 atomic %, and Fe being contained in a remaining concentration, with a total concentration of at least one of Co and Ni, Fe, M, Q, C and R being 100 atomic %.

14. A ferromagnetic film according to claim 13, wherein the rare earth element is at least one member selected from the group consisting of Ce, Pr, Nd, Sm, Tb, Dy and Gd.

15. A corrosion resistant ferromagnetic film made of an alloy of FeMQC-R containing at least one of Co and Ni and having crystal grains of Fe, wherein M is at least one element selected from the group consisting of Hf, Zr, Ta, Nb and W; Q is at least one element selected from the group consisting of Cr, Rh and Ru; and R is at least one rare earth element, said M being contained in the concentration of 0.5 to 10 atomic %, said Q being contained in a concentration of 1.5 to 12 atomic %, said C being contained in a concentration of 2.0 to 14 atomic %, said at least one of Co and Ni being contained in a concentration of 15 atomic % or less, said R being contained in a concentration of 0.5 to 7 atomic %, and Fe being contained in a remaining concentration, with a total concentration of at least one of Co an Ni, Fe, M, Q, C and R being 100 atomic %.

16. A ferromagnetic film according to claim 15, wherein the rare earth element is at least one member selected from the group consisting of Ce, Pr, Nd, Sm, Tb, Dy and Gd.

17. A magnetic head obtained by using the corrosion resistant ferromagnetic film of claim 1 as at least a part of a magnetic head core.

18. A magnetic head obtained by using the corrosion resistant ferromagnetic film of claim 3 as a part of a magnetic head core.

19. A magnetic head obtained by using the corrosion resistant ferromagnetic film of claim 5 as at least a part of a magnetic head core.

20. A magnetic head obtained by using the corrosion resistant ferromagnetic film of claim 7 as at least a part of a magnetic head core.

21. A magnetic head obtained by using the corrosion resistant ferromagnetic film of claim 9 as at least a part of a magnetic head core.

22. A magnetic head obtained by using the corrosion resistant ferromagnetic film of claim 11 as at least a part of a magnetic head core.

23. A magnetic head obtained by using the corrosion resistant ferromagnetic film of claim 13 as at least a part of a magnetic head core.

24. A magnetic head obtained by using the corrosion resistant ferromagnetic film of claim 15 as at least a part of a magnetic head core.

25. A ferromagnetic film according to claim 1, wherein the element M is in the form of a carbide made by heat treatment, said carbide precipitating on boundaries of the crystal grains of Fe so as to inhibit the growth of the Fe crystal grains.

26. A ferromagnetic film according to claim 9, wherein the element M is in the form of a carbide made by heat treatment, said carbide precipitating in boundaries of the crystal grains of Fe so as to inhibit the growth of the Fe crystal grains.

27. A ferromagnetic film according to claim 11, wherein the element M is in the form of a carbide made by heat treatment, said carbide precipitating on boundaries of the crystal grains of Fe so as to inhibit the growth of the Fe crystal grains.

28. A ferromagnetic film according to claim 13, wherein the element M is in the form of a carbide made by heat treatment, said carbide precipitating on boundaries of the crystal grains of Fe so as to inhibit the growth of the Fe crystal grains.

29. A ferromagnetic film according to claim 15, wherein the element M is in the form of a carbide made by heat treatment, said carbide precipitating on boundaries of the crystal grains of Fe so as to inhibit the growth of the Fe crystal grains.

* * * * *